June 10, 1958  T. Y. KORSGREN, SR., ET AL  2,837,926
SEALED DRIVE MECHANISM
Filed Nov. 16, 1956
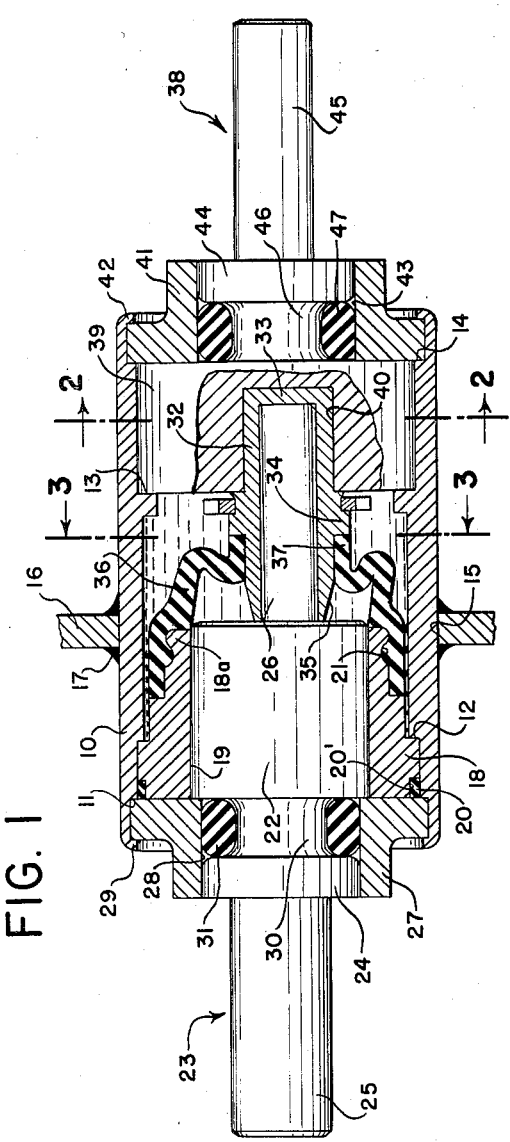
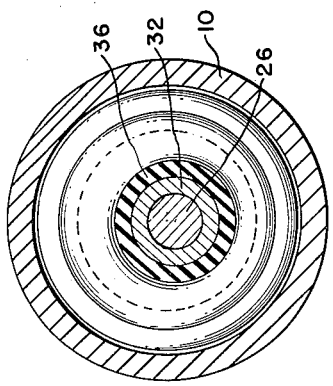
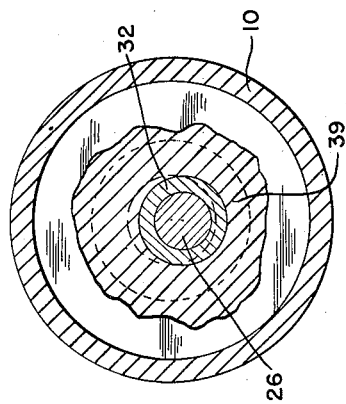
INVENTORS,
Theodore Y. Korsgren, Sr.
Frank Stelma
BY
ATTORNEYS

United States Patent Office 2,837,926
Patented June 10, 1958

2,837,926

SEALED DRIVE MECHANISM

Theodore Y. Korsgren, Sr., Woodbury, and Frank Stelma, West Cheshire, Conn., assignors to Haydon Switch Incorporated, Waterbury, Conn., a corporation of Connecticut Application November 16, 1956, Serial No. 622,563

9 Claims. (Cl. 74—17.8)

The present invention relates to sealed drive mechanisms for transmitting rotary movement from one point to another, and more particularly to an improved sealed rotary transmission mechanism adapted for operation under conditions in which the opposite sides of the mechanism may be subjected to greatly differing pressures.

In various control devices, such as those used in high altitude aircraft, for example, it is desirable to encase and hermetically seal small delicate moving parts of the control device, so that such parts are not damaged or rendered inoperative by ice accumulations or other phenomena. Where a control device is employed in a high altitude aircraft, for example, the hermetic sealing of its various mechanisms presents a considerable problem, particularly in regard to the substantial pressure differentials to which the interior and exterior of the device may be exposed at high altitudes.

In accordance with the present invention, a novel mechanism is provided for transmitting rotary movement between two points in a manner such that the input member of the mechanism is hermetically sealed from the output member and in a manner such that the mechanism is relatively unaffected by substantial pressure differentials to which the opposite sides of the mechanism may be subjected.

A more specific feature of the invention resides in the provision of a hermetically sealed device for transmitting a rotary movement from one point to another, wherein sealed chambers are provided on opposite sides of a flexible sealing element, the sealed chambers being filled with a relatively incompressible fluid. Advantageously, the relatively incompressible fluid is a suitable silicone oil which lubricates the workings of the mechanism as well as prevents undue distortion of the sealing element under the influence of pressure differentials to which the mechanism may be exposed.

The invention also contemplates the provision of a novel hermetically sealed drive mechanism of the type and having the characteristics described above which is of a rugged, yet simplified construction, and which is adapted for efficient assembly.

For a better understanding of the invention, reference should be made to the following detailed description and accompanying drawings, in which:

Fig. 1 is a longitudinal cross-sectional view of a sealed drive mechanism constructed in accordance with the invention; and Figs. 2 and 3 are transverse cross-sectional views taken along lines 2—2 and 3—3, respectively, of Fig. 1.

Referring now to the drawing, the numeral 10 designates an elongated tubular casing formed of a suitable non-porous material, such as steel. The casing 10 is open at both ends and has a pair of shoulders 11, 12, facing outwardly at a first end thereof and another pair of shoulders 13, 14 facing outwardly at the second end thereof. The exterior of the casing is generally cylindrical, so that the casing may be received in an opening 15 of a suitable housing 16. Generally, the casing 10 will be brazed or otherwise secured in sealed relation to the housing 16, as indicated at 17.

Received in the interior of the casing 10, and seated against the shoulder 12 thereof, is a bearing sleeve 18. The sleeve 18 has an enlarged opening 19 therethrough, which is disposed in concentric relation to the casing 10 and forms a journal portion. Advantageously, the bearing sleeve 18 is secured in sealed relation to the casing 10, and, to this end, a resilient sealing ring 20 is seated in an outwardly facing recess 20' in the bearing sleeve, the sealing ring being held tightly between the bearing sleeve and casing.

The right-hand end of the bearing sleeve 18, as viewed in Fig. 1, has a portion 18a of reduced diameter which projects into the interior of the casing. The outer surface of the projecting portion 18a is spaced from the inner wall of the casing 10, and is preferably provided with an annular groove 21 adjacent its end extremity.

Received within the large opening 19 of the bearing sleeve, and journaled thereby, is an enlarged journal portion 22 of a first rotatable member, generally designated by the numeral 23. The rotatable member 23, which, for the purpose of description, may constitute the input element of the mechanism, has a neck portion 24 and an extension 25 projecting outwardly of the casing and disposed in concentric relation to the journal portion 22. At the opposite side of the journal portion 22 is an eccentric arm 26, which projects into the interior of the casing.

To close off the first or left-hand end of the casing 10, there is provided an end cap member 27 which seats against the outwardly facing shoulder 11 in the casing and has an opening 28 therethrough, in which the neck portion 24 of the rotatable member 23 is closely received. As will be observed in Fig. 1, the opening 28 in the end cap 27 is of smaller diameter than the journal portion 22 of the rotatable input member, so that the end cap forms a shoulder limiting outward movement of the input member 23 in the casing. Advantageously, the end cap 27 is secured in place by end portions 29 of the casing 10, which are bent inwardly, as by rolling, to lockingly engage the base or flange of the end cap. It will be understood that the end cap 27 is so affixed to the casing 10 as to form a seal therewith.

Intermediate it sends, the neck portion 24 of the rotatable input member 23 is provided with a relatively deep annular groove 30, in which is received a resilient O-ring sealing member 31. The O-ring 31 is advantageously formed of a silicone rubber composition, and is of a size such that it is deformed slightly when the neck portion 24 is fully received in the opening 28 of the end cap. The arrangement is such that a liquid seal is formed between the rotatable member 23 and the end cap 27, and hence between the rotatable member of the casing 10.

Received over the outer end of the eccentric portion 26 of the input member 23 is an elongated generally cylindrical bearing cap 32 formed of a material having suitable friction-free characteristics. The bearing cap 32 is closed at one end, as at 33, and surrounds the eccentric arm 26 throughout at least a portion of its length. Intermediate the ends of the bearing cap 32 there is an integral flange 34. The outer wall of the bearing cap is of generally cylindrical form, immediately inward of the flange 34, and the extreme inner end of the bearing cap may be tapered to a reduced diameter, as at 35. In accordance with the invention, the bearing cap 32 is freely rotatable with respect to the eccentric portion 26 of the input member 23. However, as will be described, the bearing cap does not rotate with respect to the casing 10 during normal operation of the mechanism.

Secured to the annular projecting portion 18a of the bearing sleeve, in sealed relation thereto, is the large end of a flexible tubular sealing element 36. The one end of the sealing element 36 projects into the interior of the casing 10, in surrounding relation to the rotatable input member 23, and is secured in sealed relation to the bearing cap 32. Advantageously, the sealing member 36 has a cylindrical end portion 37 of relatively small diameter which is adapted to be received over the cylindrical inner portion of the bearing cap 32, in abutting relation to the flange 34 thereof. As will be observed in Fig. 1 the sealing element 36, intermediate its ends, fits loosely about the rotatable member 23 and bearing cap 32 whereby to define a chamber.

The sealing element 36 may be formed of several resilient, non-porous materials. However, I have found a silicone rubber composition to be most suitable for this purpose.

Received in the second or right-hand end of the casing 10 is a second rotatable member 38, which has an enlarged journal portion 39 seated against the outwardly facing shoulder 13 and journaled by the inner wall of the casing 10. The enlarged journal portion 39 has a recess 40 therein located eccentrically with respect to the axis of rotation of the member 38, and adapted to receive the outer end of the bearing cap 32.

The rotatable member 38, which, for the purpose of description, may be considered the output member of the mechanism, is held in place in the casing by means of an end cap 41 seated against the outwardly facing shoulder 14 of the casing and secured in place, in sealed relation to the casing, by inturned portions 42 of the casing wall. The end cap 41 has an enlarged opening 43 therethrough which closely receives a concentric neck portion 44 of the output member 38. An extension 45 of the output member 38 projects outwardly beyond the end cap 41, in concentric relation, for attachment to a device (not shown) to be driven by the mechanism.

As shown in Fig. 1, the neck portion 44 of the output member 38 has a deep annular groove 46 receiving a resilient O-ring sealing member 47. The sealing member is adapted to be compressed between the groove 46 and opening 43 to form a liquid seal between the output member 38 and the casing.

In accordance with the invention, the flexible tubular sealing element 36 has intermediate portions spaced from the wall of the casing 10 and from the rotatable output member 38. The arrangement is such that a second chamber is formed within the casing. When the drive mechanism is assembled, the chambers on opposite sides of the flexible sealing element 36 are filled with a relatively non-compressible fluid, such as silicone oil, whereby the moving parts of the mechanism are lubricated and the flexible sealing element is backed on both sides by an incompressible medium. The O-ring sealing members 31, 47, at opposite ends of the casing, form fluid seals, which by means of the liquid filler is sealed within the interior of the mechanism.

In the operation of the new device, rotary input movement is imparted to the first rotatable member 23, whereby to cause the eccentric portion 26 thereof to move in a circular path. Since the second rotatable member 38 of the mechanism is confined to rotational movement about a fixed axis, the movements of the eccentric portion 26 will cause the output member 38 to be rotated along with the input member 23. During such rotary movements, the bearing cap 32 does not rotate, but oscillates in the circular path generated by the eccentric portion 26. The flexible sealing element 36, being attached to the bearing cap 32, is caused to oscillate along with the latter, while being at all times in sealed relation thereto. The sealing element 36 should, of course, have sufficient flexibility to oscillate throughout complete cycles with the bearing cap 32 without being unduly stressed.

When the new drive mechanism is exposed to greatly differing pressures at opposite sides, the flexible sealing element 36 will not be materially effected, since it is backed on opposite sides by a relatively non-compressible fluid retained in the casing 10 by means of the O-rings 31, 47. In this respect, it will be understood that the O-ring seals, while not being sufficient to hermetically seal the mechanism to the extent desired, are adequate for retaining the filler oil within the casing.

It should be understood however that the specific mechanism herein illustrated and described is intended to be representative only, as certain changes may be made therein without departing from the clear teachings of the invention. Accordingly, reference should be made to the following appended claims in determining the full scope of the invention.

We claim:

1. A sealed drive mechanism for transmitting rotary movement from a first point to a second point, where said points may be at substantially different pressures, comprising a tubular casing having a first shoulder facing outwardly at one end and a second shoulder facing outwardly at the other end, a bearing sleeve received in said casing and seated against said first shoulder, said bearing sleeve having an enlarged axial opening therethrough forming a journal portion and having an inwardly projecting annular extension, a first end cap received at the first end of said casing and seated adjacent said bearing sleeve, said end cap having an opening therethrough concentric with but smaller than the opening of said bearing sleeve and partially closing off the latter, a first rotatable member having an enlarged cylindrical portion journaled in the opening in said bearing sleeve and having a concentric portion projecting outwardly of said casing and an eccentric portion projecting into the interior of the casing, said concentric portion including a grooved neck closely received in the opening in said end cap, a resilient O-ring sealing element received in the groove of said neck and forming a liquid seal between said neck and said end cap, a bearing cap received over the eccentric portion of said first rotatable member, said bearing cap being closed at its outer end, a flexible tubular sealing element secured in sealed relation to said bearing cap inwardly of the outer end thereof and to the annular extension of said bearing sleeve, said sealing element being spaced from the bearing cap and first rotatable member throughout a portion of its length whereby to form a first chamber for sealing liquid, a second rotatable member having an enlarged portion rotatably received in said casing and seated against said second shoulder, said second rotatable member having an eccentrically located cylindrical recess therein closed at one end and opening in the interior of said casing, said bearing cap being received at its outer end in said recess, said second rotatable member having a grooved neck, a second resilient O-ring sealing element received in the neck of said second rotatable member, and a cap received at the said other end of said casing and having an opening therein closely receiving said second O-ring element and forming therewith a liquid seal, said tubular sealing element having portions spaced from said second rotatable member whereby to form a second chamber for sealing liquid.

2. A sealed drive mechanism for transmitting rotary movement from a first point to a second point where said points may be at substantially different pressures, comprising a tubular casing, bearing means at a first end of said casing having an opening of reduced diameter forming a journal portion, a first rotatable member having a portion received in said journal portion and having a concentric portion extending outwardly of one end of said casing and an eccentric portion projecting into the interior of said casing, means forming a liquid seal between said first rotatable member and the first end of said casing, an elongated cylindrical bearing cap received over said eccentric portion and closed at its outer end, a flexible tubular sealing element secured at one end in sealed relation to said bearing means and at its other end in sealed relation to said bearing cap inwardly of the outer end thereof, a second rotatable member journaled in said casing, said second rotatable member having recess means therein for receiving the outer end portion of said bearing cap, and means forming a liquid seal between said second rotatable member and the second end of said casing, said liquid seal forming means and said tubular sealing element forming a pair of isolated and opposed chambers for sealing liquid.

3. The sealed drive mechanism of claim 2, characterized by said opposed chambers being filled with silicone oil.

4. The seal drive mechanism of claim 2, characterized by said mechanism having end caps received at each end of said casing and having restricted openings therein partially closing off the ends of said casing, said rotatable members having neck portions extending through said openings, and said liquid seal forming means comprising O-rings received about said neck portions and having liquid sealing engagement with said end caps.

5. A sealed drive mechanism for transmitting rotary movement from a first point to a second point, where said points may be at substantially different pressures, comprising a tubular casing, a first rotatable member received in said casing and having a concentric portion projecting from a first end of the casing and an eccentric portion projecting into the interior of the casing, a closed bearing cap received over the said eccentric portion, a flexible tubular sealing element secured at one end in fixed and sealed relation to said casing and secured at its other end in fixed and sealed relation to said bearing cap, a second rotatable member received in said casing and having eccentric recess means therein for receiving said bearing cap, and means on opposite sides of said tubular sealing element forming rotating liquid seals between the said casing and said rotating members, said liquid seal forming means and said sealing element forming a pair of opposed chambers on opposite sides of said sealing element, said chambers being filled with a sealing and lubricating liquid.

6. The sealed drive mechanism of claim 5, characterized by said mechanism including a bearing sleeve secured in sealed relation in said casing and having an annular portion extending into said casing in spaced relation to the inner wall thereof, said sealing element being secured at said one end to said annular portion.

7. The sealed drive mechanism of claim 5, characterized by said liquid seal forming means comprising O-rings engaging said rotatable members and positioned in sealing relation to said casing.

8. The sealed drive mechanism of claim 5, characterized by said bearing cap comprising an elongated generally cylindrical member having a flange intermediate its ends, said sealing element having a generally cylindrical end portion received over the inner end of said bearing cap and abutting said flange.

9. A sealed drive mechanism for transmitting rotary movement from a first point to a second point, where said points may be at substantially different pressures, comprising a tubular casing, a first rotatable member received in said casing and having a concentric portion projecting from a first end of the casing and an eccentric portion projecting into the interior of the casing, a closed bearing cap received over the said eccentric portion, a flexible tubular sealing element secured at one end in fixed and sealed relation to said casing and secured at its other end in fixed and sealed relation to said bearing cap, a second rotatable member received in said casing and having eccentric recess means therein for receiving said bearing cap, and means on opposite sides of said tubular sealing element forming rotating seals between said casing and said rotating members, said seal forming means and said sealing element forming a pair of opposed chambers on opposite sides of said sealing element, said chambers being filled with a substantially non-compressible fluid material.

No references cited.